US012790455B2

(12) United States Patent
Olive

(10) Patent No.: US 12,790,455 B2
(45) Date of Patent: Nov. 10, 2026

(54) COMPOSITIONS REMOVABLE BY THERMAL ACTIVATION, USES AND ASSEMBLIES COMPRISING SUCH COMPOSITIONS

(71) Applicant: RESCOLL, Pessac (FR)

(72) Inventor: Maxime Olive, Talence (FR)

(73) Assignee: RESCOLL, Pessac (FR)

( * ) Notice: Subject to any disclaimer, the term of this patent is extended or adjusted under 35 U.S.C. 154(b) by 994 days.

(21) Appl. No.: 17/634,412

(22) PCT Filed: Aug. 12, 2020

(86) PCT No.: PCT/EP2020/072572

§ 371 (c)(1),
(2) Date: Feb. 10, 2022

(87) PCT Pub. No.: WO2021/028457

PCT Pub. Date: Feb. 18, 2021

(65) Prior Publication Data

US 2022/0289929 A1 Sep. 15, 2022

(30) Foreign Application Priority Data

Aug. 12, 2019 (FR) ........................................ 1909150

(51) Int. Cl.

| | |
|---|---|
| ***C08J 9/32*** | (2006.01) |
| ***C08K 7/22*** | (2006.01) |
| ***C09J 7/35*** | (2018.01) |
| ***C09J 177/06*** | (2006.01) |

(52) U.S. Cl.

CPC .................... *C08J 9/32* (2013.01); *C08K 7/22* (2013.01); *C09J 7/35* (2018.01); *C09J 177/06* (2013.01); *C08J 2203/22* (2013.01); *C08J 2377/06* (2013.01)

(58) Field of Classification Search

CPC ... C08J 9/0066; C08J 9/08; C08J 9/103; C08J 9/105; C08J 9/32; C08J 2203/02; C08J 2203/04; C08J 2203/22; C08J 2377/06; C08K 7/16; C08K 7/22; C08L 77/06; C09D 5/002; C09D 5/008; C09D 5/20; C09D 7/20; C09D 7/70; C09D 177/00; C09J 7/35; C09J 177/06; Y02P 20/582

See application file for complete search history.

(56) References Cited

U.S. PATENT DOCUMENTS

| | | | |
|---|---|---|---|
| 4,844,833 | A | 7/1989 | Komatsu et al. |
| 5,017,303 | A | 5/1991 | Komatsu et al. |
| 5,804,158 | A | 9/1998 | Pollak et al. |
| 5,935,655 | A | 8/1999 | Beleck |
| 2012/0135223 | A1 | 5/2012 | Alcorta et al. |
| 2017/0160641 | A1 | 6/2017 | Endres |

FOREIGN PATENT DOCUMENTS

| | | | | |
|---|---|---|---|---|
| CN | 101068895 | A * | 11/2007 | ............. C08G 69/26 |
| EP | 161121781 | B1 | 8/2007 | |
| EP | 181493581 | B1 | 7/2008 | |
| WO | WO00/75254 | A1 | 12/2000 | |
| WO | WO 2010/105924 | A1 | 9/2010 | |
| WO | WO 2016/017648 | A1 | 2/2016 | |

OTHER PUBLICATIONS

English translation of WO 2016/017648 (Year: 2016).*
English translation of CN-101068895-A (Year: 2007).*

* cited by examiner

*Primary Examiner* — John M Cooney
(74) *Attorney, Agent, or Firm* — Greer, Burns & Crain, Ltd.

(57) ABSTRACT

The invention concerns a removable composition formed by at least:

a polyamide or a copolyamide or a mixture of polyamides or a mixture of copolyamides or a mixture of at least one polyamide and at least one copolyamide, the polyamide(s) and copolyamide(s) being soluble in alcohol, and an expansion agent, the maximum expansion temperature of which is greater than the melting point of the polyamide or the copolyamide or of the mixture. The invention also relates to assemblies comprising such a composition, the use thereof and a method for detaching the composition.

20 Claims, 1 Drawing Sheet

COMPOSITIONS REMOVABLE BY THERMAL ACTIVATION, USES AND ASSEMBLIES COMPRISING SUCH COMPOSITIONS

CROSS-REFERENCE TO RELATED APPLICATIONS

This application is a U.S. National Stage Application of PCT/EP2020/072572 assigned the international filing date of Aug. 12, 2020 and claiming the benefit of priority from French patent application FR1909150 filed Aug. 12, 2019, the disclosure of these applications is herein incorporated by reference.

TECHNICAL FIELD

The present invention relates to a composition that can be used as a primer removable by thermal activation. An object of the invention is also the uses of this composition, in particular as a removable primer, and assemblies including this composition.

BACKGROUND

Many removable primers or coatings have been described in the prior art.

Most of them are primers that must be removed by using water or solvents or by mechanical means, and which require significant effort and intervention time for a result that is not satisfying.

There are also primers or coatings that are removable under the action of heat. Mention may be made, for example, of patent application WO00/75254, which describes an arrangement with a polymer-based seal including microcapsules containing expansion agents of the low boiling point solvent type that cause decohesion of the seal under the action of direct heat and sufficient power, thus facilitating removal. These microspheres may be used in adhesion primers. After activation and expansion of the microcapsules within the primer, the latter has lost all its cohesion and disassembly is possible. However, the carrier supports of the primer are soiled and must be reprocessed to be able to be re-adhered. Patent EP 1,611,217 relates to a similar solution, with the use of a primer composed of a polymer base and an agent for degrading the primer in its mass. Like for the previous patent, cleaning the substrates after detachment is not easy.

Mention may also be made of the publication by Sato (International Journal of Adhesion and Adhesives, 23, 2003, pp. 377-382), which describes this type of coating, as well as U.S. Pat. No. 4,844,833, which describes heat-expandable beads in a water-soluble underlayer. In this patent, it is proposed to heat the underlayer in order to expand it and thus to facilitate the penetration of water and the dissolution of a paint. This is also the case for U.S. Pat. No. 5,904,158, which specifies in particular that the activation temperature of the thermally expandable beads must be 30° F. higher than the curing temperature of the paint, or even U.S. Pat. No. 5,935,655, which specifies that the activation is done in hot water, and also U.S. Pat. No. 5,017,303, which provides details on the thermally expandable microspheres and the types of paints used. All of the solutions described in these prior documents have the drawback of a high sensitivity of the materials to water (water-soluble binders) and of a use centered on paints. These solutions therefore do not provide answers to the problems of stripping painted parts or separating bonded parts, in the case of parts that have undergone a service life with mechanical or environmental stress (humidity, chemicals, etc.).

A solution to these various problems has been provided in patent application EP 1,814,935, which describes a method for assembling supports by bonding with a polymer matrix comprising a migrating agent, as well as a method for disassembling the bonded assembly, which consists in supplying energy to the migrating agent so as to cause its migration toward at least one of the polymer matrix/support interfaces in order to generate a layer of weak cohesion and to separate the elements.

Migrating agents such as pTSH melt and migrate to the interface, then decompose there to induce interfacial detachment.

Such a disassembly method allows the assembly to be disassembled.

However, this technology can be improved; in particular, it is important to be able to detach the two linked supports even more easily by easily removing the primer that links them, and also to be able to recover the clean supports without any residue very easily and without danger.

SUMMARY

The object of the invention is to overcome the drawbacks of the prior art by proposing a primer, a particular composition, removable by thermal activation, cleanable cold very easily with alcohol, which is not necessarily used as an adhesion primer, and which has a simple shear stress of more than 10 MPa when it is used in combination with a structural adhesive in a bonded assembly.

In particular, the subject of the invention is a composition removable by thermal activation when it is used as a primer between two materials, consisting at least of:

- a polyamide soluble in alcohol, preferably a copolyamide soluble in alcohol, or a mixture of polyamides soluble in alcohol, preferably a mixture of copolyamides soluble in alcohol, or a mixture of at least one polyamide soluble in alcohol other than a copolyamide and at least one copolyamide soluble in alcohol, and
- an expansion agent, the maximum expansion temperature of which is higher than the melting point of the polyamide or of the mixture.

The materials between which the composition according to the invention is used may be of the same nature or of different natures.

Advantageously, the composition may be used as a primer on a support before applying an adhesive. When it is liquid, it is applied to the support and must dry before depositing the adhesive. It may advantageously dry in the open air. It is then possible to adhere with any type of adhesive. The invention may be used on all types of supports.

Polyamides soluble in alcohol have a melting point that allows the composition to be softened greatly when it is heated. Since the expansion agent has an expansion temperature higher than the melting temperature of the polyamide or of the mixture, significant foaming of the composition is obtained (the latter being very soft) at this temperature, which is higher than the melting temperature of the polyamide or the mixture, and a disassembly of the supports is obtained with a break in the composition requiring a low effort.

Composition residues are easily cleaned with an alcohol (ethanol, IPA, etc.). The supports are then very easy to reuse, which is not the case with the primer technologies of the prior art, in particular those based on a crosslinked polymer binder.

The composition according to the invention may also be used as a sacrificial layer in a paint system, for example between an aeronautical anti-corrosion primer and a finishing paint. When heated to a temperature allowing the expansion agent to expand, this temperature being higher than the melting point of the polyamide or of the mixture, the paint detaches and the surface can be cleaned with alcohol. The anti-corrosion primer is not impacted, because the thermal detachment is selective.

The composition according to the invention may also be used between a support and a paint or a coating, and heating allows the support to be stripped as well as easy complete removal of the paint or the coating.

The composition according to the invention may therefore be used as a primer between two materials, in particular as a primer between a coating and a support or between a coating and an adhesive or between an adhesive and a support or between two layers of coating (paint, varnish, laminants in particular).

The invention therefore also relates to such a use, as well as assemblies comprising a first material and a second material linked together by an intermediate layer consisting of a composition according to the invention.

Finally, the invention also relates to a method for detaching a composition according to the invention, after it has been applied to at least one element or between two materials, characterized in that it comprises implementing the following steps:

thermal activation, preferably cold detachment ideally, and if necessary, hot, cleaning of residues.

DETAILED DESCRIPTION

Definitions

Figure 1:
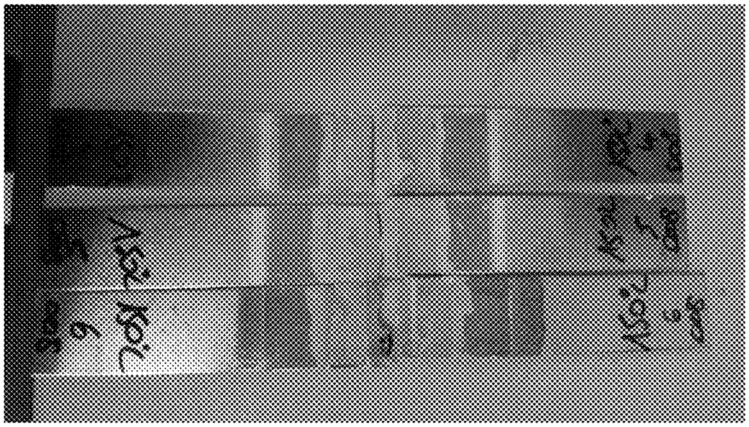
FIG. 1 shows a photograph of aluminum supports after detachment, after implementing test 1.

Within the meaning of the invention, "assembly" means an assembly consisting of at least two materials comprising therebetween at least one layer of composition according to the invention.

Within the meaning of the invention, "detachment" means the separation of two assembled materials comprising therebetween at least one layer of composition according to the invention, for example a paint and a support, an adhesive and a support, an adhesive and a paint, two supports, etc., or the separation of the composition according to the invention from the material(s) to which it has been applied.

Within the meaning of the invention, "removable" means a composition that can be detached, that is to say, which can be separated from the material(s) on which it has been applied.

Within the meaning of the invention, "removable by thermal activation" means a composition that can be detached (that is to say, which can be separated from the material(s) on which it has been applied) under the action of heat.

Within the meaning of the invention, "expansion agent" means a constituent capable of generating a mechanical stress under the effect of temperature, this stress resulting in an expansion of the matrix in which this constituent is present. The mechanical stress is obtained by a gaseous expansion (volume expansion) either by an effect of decomposition of the constituent into gas, or by the boiling of a liquid. Within the meaning of the invention, "maximum expansion temperature" means the temperature at which the activity of the expansion agent is maximal, or high enough to allow detachment. For chemical expansion agents, it is a volume of gas generated, and for physical expansion agents, a rate of particle expansion.

Within the meaning of the invention, "soluble in alcohol" means soluble in any alcohol, preferably light aliphatics or benzyl alcohol, it being understood that phenols and cresols are not alcohols. Preferably, the quantity of solubilizable polyamide must be at least 5 g of polyamide per 100 g of alcohol.

DETAILED DESCRIPTION OF THE INVENTION

The invention therefore relates to a removable composition, consisting at least of:

- a polyamide soluble in alcohol, preferably a copolyamide, or a mixture of polyamides soluble in alcohol, preferably a mixture of copolyamides, or a mixture of at least one polyamide soluble in alcohol other than a copolyamide and at least one copolyamide soluble in alcohol, and
- an expansion agent, the maximum expansion temperature of which is higher than the melting point of the polyamide or of the mixture.

This composition, when applied to a material or between two materials, is removable by thermal activation.

If the composition comprises one or more copolyamide(s), the copolyamide(s) present in the composition are preferably chosen from aromatic, aliphatic and alicyclic copolyamides.

The composition according to the invention therefore comprises at least:

- a polyamide soluble in alcohol, preferably at least one copolyamide soluble in alcohol, or
- a mixture of a polyamide soluble in alcohol other than a copolyamide and a copolyamide soluble in alcohol, or
- a mixture of at least two polyamides soluble in alcohol other than copolyamides, or
- a mixture of at least two copolyamides soluble in alcohol, or
- a mixture of a polyamide soluble in alcohol other than a copolyamide and at least two copolyamides soluble in alcohol, or
- a mixture of at least two polyamides soluble in alcohol other than copolyamides and one copolyamide soluble in alcohol, or
- a mixture of at least two polyamides soluble in alcohol other than copolyamides and at least two copolyamides soluble in alcohol.

The polyamide(s) must be soluble in alcohol, preferably in alcohols chosen from light aliphatic alcohols or benzyl alcohol.

The composition also comprises at least one expansion agent. This expansion agent must have a maximum expansion temperature that is higher than the melting point of the polyamide or of the mixture if the composition comprises a mixture of polyamide(s).

The expansion agent can be chosen in particular from thermally expandable microspheres, azodicarbonamide, expandable graphite, polycarboxylic acids, sulfonylhydrazides. The choice must be made in particular according to the polyamide or the mixture of polyamide(s).

Preferably, the polyamide(s)/expansion agent or mixture of polyamide(s)/expansion agent ratio is between 100 to 1 and 1 to 1, even more preferably between 10 to 1 and 10 to 4. In fact, such a ratio makes it possible to optimize the mechanical strength of the composition before activation and the removability by thermal activation (ratio between the expansion and the mechanical strength of the composition when hot).

In addition to these constituents, the composition according to the invention may comprise other constituents. In particular, the composition according to the invention may comprise at least one other constituent chosen from pigments, rheological agents, deaerating agents, fillers allowing heating by heat and electrical and/or thermal conductive fillers.

The composition according to the invention may be in solid form or in liquid form. When it is in liquid form, the composition according to the invention may comprise at least water as solvent and/or at least one organic solvent. In particular, the composition according to the invention may comprise, as solvent, at least

- water, or
- an organic solvent, or
- a mixture of solvents consisting of at least two organic solvents or of at least one organic solvent and water.

When the composition mainly comprises water (as continuous phase), the polyamide(s) is (are) preferentially dispersed in water.

When the composition comprises at least one organic solvent, the polyamide(s) is (are) preferentially dissolved in the solvent or the mixture of solvents.

The organic solvent(s) are preferably chosen from ethanol, isopropanol, xylene and toluene.

When the composition according to the invention is in solid form, it is preferably in the form of a dry film. This dry film may be used as a hot melt coating, which is implemented under hot pressing.

The composition according to the invention may be manufactured according to a method comprising the following steps:

- disperse or dissolve the polyamide(s) in the solvent, in particular depending on the presence of water in the solvent,
- disperse or dissolve the expansion agent in the solution, very preferably disperse the expansion agent in the solution,
- disperse or dissolve any other constituents such as dyes, stabilizers, etc.

The composition may be stored for several months at room temperature before use. The composition may advantageously be used as a primer removable under the action of heat. In particular, the composition according to the invention may be used as a primer on a material or between two materials. The material(s) may be chosen from coatings, adhesives and supports (such as an object, a part of any kind, a wall, a floor, etc.). The composition according to the invention may in particular be used as a primer between a coating and a support or between a coating and an adhesive or between an adhesive and a support or between two layers of coating.

According to a variant, the composition according to the invention may be used as a hot melt adhesive.

Thus, the invention also relates to the various uses referred to above as well as the assemblies formed during these uses. In particular, the invention relates to an assembly comprising a first material and a second material linked together by an intermediate layer consisting of a composition according to the invention, and in particular an assembly characterized in that:

- the first material is a solid support and the second material is a paint, or
- the first material is a coating and the second material is an adhesive, or
- the first material is a solid support and the second material is an adhesive, or
- the first material is a coating and the second material is a coating, or
- the first material is a solid support and the second material is a solid support.

These assemblies may be made as described below:

- When the composition is in liquid form, it is applied to one of the materials. It is then necessary to leave it to dry between 5 minutes and 12 hours at a temperature between 20 and 80° C., the temperature having to be lower than the melting point of the polyamide. Then the second material is deposited on the dried composition according to the invention.
- When the composition is in the form of a dry film, said film may be used as an adhesive by hot pressing between two materials.

Advantageously, the composition according to the invention may be disassembled by thermal activation, thus making it possible to disassemble the assembly in order to recover the materials and in particular the supports on which or between which the composition has been deposited.

In particular, the invention relates to a method for detaching or removing a composition according to one of the preceding claims after it has been applied to at least one material or between two materials, characterized in that it comprises carrying out the following steps:

- thermal activation,
- detachment, preferably cold, and if necessary hot,
- cleaning of residues on the material(s).

The thermal activation may be carried out by various techniques, in particular by contactless heating (for example, induction or microwaves) or by electrical (Joule effect) or thermal heating (drying oven, infrared lamp, hot air tunnel, heat gun).

For induction or microwave heating, the following fillers may in particular be used: PEG, Ferrites, carbonyl iron (ultra-pure iron powder).

For heating by electrical conduction, it is possible in particular to use the following fillers: copper particles coated with silver, silica particles coated with silver, graphite, carbon black, carbon nanotube, silver particles. These fillers may be used to provide sufficient conductivity to the composition according to the invention to allow heating by Joule effect under the effect of the passage of an electric current. These fillers may also be used to allow the composition according to the invention to maintain electrical conduction within the assembly, which may be necessary for certain applications, in particular for the dissipation of electrostatic charges.

To improve the thermal conduction of the composition, it is possible in particular to use the following fillers: graphite, metallic fillers, boron nitride. This conduction may be necessary in certain assemblies, for example, for bonding radiators.

The thermal activation is carried out at a temperature above the melting point of the polyamide or of the mixture of polyamide(s) and corresponding to a temperature at which the expansion agent is capable of expanding the composition according to the invention, preferably the maximum expansion temperature of the expansion agent.

The expansion temperature may for example be 150° C. plus or minus 10%.

After thermal activation, the detachment is preferably carried out cold, which is advantageous because this makes it easier to handle the materials (supports in particular) without specific equipment for handling hot surfaces. The detachment may be carried out manually or automatically.

If residues remain, cleaning may be carried out easily, in particular using an alcohol, with prior simple mechanical removal of the coarsest residues if necessary.

Advantageously, the invention thus allows detachment needs to be met on demand for bonded assemblies, in particular structural ones, as well as stripping needs, by allowing selective stripping in the case of painted substrates (the composition is stripped off according to the invention, leaving the lower layers intact). It also provides an effective solution to the reuse of substrates, since cleaning is easy (unlike technologies that are limited to disassembly).

The invention is now illustrated by examples of compositions according to the invention as well as by tests.

EXAMPLES

Example 1

Example 1 is a primer composition obtained by implementing the following steps:

- dissolve 120 g of PLATAMID M 1276 in 650 g of isopropanol, 150 g of xylene and 80 g of water,
- disperse 24 g of Expancel 930 DU 120 in the solution,
- disperse 1.6 g of dye.

Example 2

Example 2 is a primer composition obtained by implementing the following steps:

- dissolve 120 g of PLATAMID 1276 in 650 g of isopropanol, 150 g of xylene and 80 g of demineralized water,
- disperse 12 g of Expancel 930 DU 120 in the solution, and optionally add a rheological stabilizer (2 g).

Test Results

Trial 1 Bonding Application

The test is carried out on aluminum supports (Al 2024 sandblasted and chemically treated) with dimensions 100×25×1.6 mm.

The test is carried out with the composition of Example 1 and with a two-component epoxy adhesive (epoxy base-mercaptan hardener).

The application operating protocol is as follows:

- apply the composition of example 1 on the aluminum substrates with a foam (buffer) and leave to dry for 30 minutes at room temperature,
- bond with two-component epoxy (containing 1% of glass beads, diameter 100-200 microns) and polymerize for 1 hour at 65° C., bonding surface 25×12.5 mm.

The mechanical strength measured at 23° C. traction 1 mm/min (on 3 test specimens) is 16.7 MPa+/−1.2 MPa.

The operating protocol for disassembly is carried out in a ventilated oven at 150° C. After 5 min at 150° C. in a ventilated oven, the test specimens are separated spontaneously in the oven or are very easily detachable after cooling to room temperature.

Figure 2:
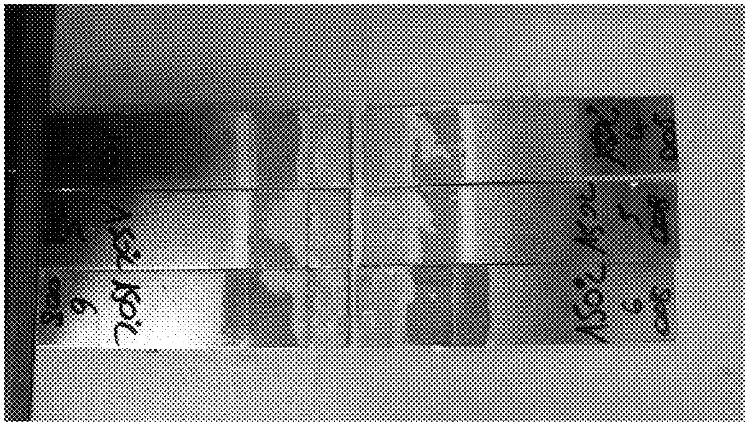
FIG. 2 shows a photograph of aluminum supports after peeling off the adhesive seals, after implementing test 1.
Figure 3:
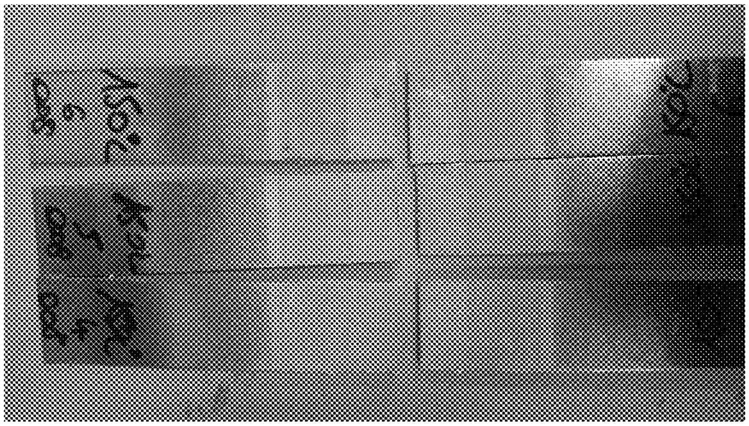
FIG. 3 shows a photograph of aluminum supports after cleaning with isopropanol, after implementing test 1.

The adhesive seal can be easily peeled off after separation of the test specimens, any adhesive residue can be easily removed with a blade and the surfaces cleaned with alcohol (isopropanol) for a final appearance almost identical to the initial one, as shown in FIGS. 1 to 3:

FIG. 1: appearance after detachment

FIG. 2: appearance after peeling of the adhesive seals

FIG. 3: appearance after cleaning with isopropanol.

Advantageously, the invention is simple to implement, versatile and makes it possible to have clean substrates after detachment and dry waste. Compared to existing technologies, it allows detachment on one substrate selectively, or both, to be universal, because a specific adhesive is not used but rather a primer and the original adhesive may be kept in the case of an existing assembly that one wishes to make detachable. The composition according to the invention allows detachment followed by simple cleaning, and therefore reuse of the substrates. It is a non-reactive system (thermoplastic binder), therefore without a polymerization step of the primer.

Test 2: Paint Stripping Application

The test is carried out on aluminum supports (chemically treated Al 2024), according to the paint scheme below:

- treated aluminum
- epoxy primer CA7049 (PPG)
- composition according to the invention (Example 2)
- CA8620 Primer (PPG)
- CA8800 finish (PPG)

The application operating protocol is as follows:

- Apply the composition according to the invention with a spray gun or filmograph on the aluminum support coated with CA7049 epoxy primer (wait 30 min before covering).
- Implement primer and finish paints according to the manufacturer's recommendations.
- Dry for several days at room temperature.

The operating protocol for stripping is carried out by activation by infrared lamp, with detachment in less than one minute (surface temperature 150° C.); the paint film is easily peeled off (in one block, all the layers above the primer) with residues of the primer peeled off on the stripped paint film and the aluminum support coated with CA7049 epoxy primer. Cleaning with alcohol is carried out and it is possible to repaint. The selectivity of the stripping and the preservation of the lower coating layers (i.e. under the primer), such as the CA7049 primer, are an advantage compared to the technologies currently used (non-selective chemical stripping, which removes all the layers of paint, sandblasting by media that also remove layers without selection). The invention does not require the use of solvent for detachment, only for final cleaning, which results in the need for simpler extraction/ventilation means and less solvent waste.

The invention may thus be used easily in aeronautics in particular and has significant advantages compared with the products currently used, which are generally two-component products (systems comprising a resin and a hardener, mainly an epoxy resin and a polyamide hardener), whereas the invention is a single component (only one composition to be used), and the particular choice yields very satisfactory chemical resistance (apart from alcohols, but in assemblies, including in an assembly of coating(s), confined mode, resistance to alcohol solvents is good).

The invention claimed is:

1. A removable composition comprising:

a polyamide soluble in alcohol at room temperature or a mixture of polyamides soluble in alcohol at room temperature, and an expansion agent, the maximum expansion temperature of which is higher than the melting point of the polyamide or of the mixture of polyamides;

wherein upon heat activation, the composition is detachable from a material onto which the composition has been applied as a coating.

2. The composition according to claim 1, wherein the alcohol is selected from light aliphatic alcohols or benzyl alcohol.

3. The composition according to claim 1, wherein the polyamide soluble in alcohol is a copolyamide soluble in alcohol or that the mixture of polyamides soluble in alcohol comprises at least one copolyamide soluble in alcohol.

4. The composition according to claim 3, wherein the copolyamide(s) is (are) selected from aromatic, aliphatic or alicyclic copolyamides.

5. The composition according to claim 1, wherein the expansion agent is selected from thermally expandable microspheres, azodicarbonamide, expandable graphite, polycarboxylic acids, sulfonylhydrazides, or any combination thereof.

6. The composition according to claim 1, wherein the polyamide(s)/expansion agent or mixture of polyamide(s)/expansion agent ratio is between 100 to 1 and 1 to 1.

7. The composition according to claim 1, wherein the polyamide(s)/expansion agent or mixture of polyamide(s)/expansion agent ratio is between 10 to 1 and 10 to 4.

8. The composition according to claim 1, wherein the composition is in liquid form.

9. The composition according to claim 1, wherein the composition further comprises water.

10. The composition according to claim 9, characterized in that the copolyamide(s) and/or polyamide(s) is (are) dispersed in water.

11. The composition according to claim 1, wherein the composition further comprises:

an organic solvent, or a mixture of solvents consisting of at least two organic solvents or of at least one organic solvent and water.

12. The composition according to claim 11, wherein the organic solvent(s) are selected from ethanol, isopropanol, xylene, toluene, or any combination thereof.

13. The composition according to claim 11, wherein the copolyamide(s) and/or polyamide(s) is (are) dissolved in the solvent or the mixture of solvents.

14. The composition according to claim 1, wherein the composition is in solid form.

15. The composition according to claim 1, wherein the composition is in a dry film form.

16. A method for detaching a composition according to claim 1 after it has been applied to at least one material or between two materials, characterized in that it comprises carrying out the following steps:

thermal activation detachment cleaning of residues.

17. An assembly comprising a first material and a second material linked together by an intermediate layer comprising a composition according to claim 1.

18. The assembly of claim 17, wherein the first material is selected from a solid support, a coating, or any combination thereof; and wherein the second material is selected from a paint, an adhesive, a coating, a solid support, or any combination thereof.

19. The composition of claim 1, wherein the composition further comprises a pigment, a rheological agent, a deaerating agent, a thermal conductive filler, an electric conductive filler, or any combination thereof.

20. The composition of claim 19, wherein the composition comprises graphite, ferrite, copper particles or silica particles coated with silver, graphite, or any combination thereof.

* * * * *